(12) United States Patent
Lee

(10) Patent No.: US 7,636,147 B2
(45) Date of Patent: Dec. 22, 2009

(54) LIQUID CRYSTAL DISPLAY PANEL AND METHOD FOR FABRICATING THE SAME

(75) Inventor: Chang-Hoon Lee, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 477 days.

(21) Appl. No.: 11/137,378

(22) Filed: May 26, 2005

(65) Prior Publication Data

US 2005/0264749 A1    Dec. 1, 2005

(30) Foreign Application Priority Data

May 29, 2004    (KR) .................... 10-2004-0038674

(51) Int. Cl.
  *G02F 1/1339* (2006.01)
(52) U.S. Cl. ...................... 349/155; 349/187
(58) Field of Classification Search .............. 349/155, 349/156, 187
  See application file for complete search history.

(56) References Cited

U.S. PATENT DOCUMENTS

| | | | | |
|---|---|---|---|---|
| 4,917,473 A | * | 4/1990 | Watanabe | 349/188 |
| 5,854,664 A | * | 12/1998 | Inoue et al. | 349/92 |
| 6,072,550 A | * | 6/2000 | Kim | 349/40 |
| 6,130,729 A | * | 10/2000 | Oh et al. | 349/43 |
| 6,573,969 B1 | * | 6/2003 | Watanabe et al. | 349/155 |
| 6,583,846 B1 | * | 6/2003 | Yanagawa et al. | 349/155 |
| 2001/0040662 A1 | * | 11/2001 | Cheng et al. | 349/141 |
| 2004/0189928 A1 | * | 9/2004 | Yang et al. | 349/155 |

FOREIGN PATENT DOCUMENTS

JP    2002-350861    12/2002

OTHER PUBLICATIONS

Communication from Korean Patent Office dated Apr. 14, 2006.

* cited by examiner

*Primary Examiner*—David Nelms
*Assistant Examiner*—Nathanael R Briggs
(74) *Attorney, Agent, or Firm*—McKenna Long & Aldridge LLP

(57) ABSTRACT

A liquid crystal display panel includes a first substrate and a second substrate, a column spacer between the first substrate and the second substrate to maintain a cell-gap, contact surfaces between the column spacer and one of the first substrate and the second substrate, at least one of the contact surfaces having a plurality of holes; and a liquid crystal layer between the first substrate and the second substrate.

11 Claims, 4 Drawing Sheets

LIQUID CRYSTAL DISPLAY PANEL AND METHOD FOR FABRICATING THE SAME

The present invention claims the benefit of Korean Patent Application No. 10-2004-0038674 filed in Korea on May 29, 2004, which is hereby incorporated by reference in its entirety.

BACKGROUND OF THE INVENTION

1. Field of the Invention

The present invention relates to a liquid crystal display panel and a method for fabricating the same, and more particularly, to a liquid crystal display panel that recovers from external forces.

2. Description of the Related Art

In general, a liquid crystal display apparatus is a display device where data signals, including image information, are individually supplied to unit pixels arranged in a matrix form. Light transmittance of the unit pixels is controlled to display a desired image. More particularly, the liquid crystal display device includes a liquid crystal display panel in which the unit pixels are arranged in a matrix form and a driving circuit for driving the unit pixels.

The liquid crystal display panel includes a first substrate on which a thin film transistor array is formed and a second substrate on which a color filter substrate is formed. The first and second substrates are attached to each other, so as to face each other and have a predetermined cell-gap therebetween. A liquid crystal layer is formed within the cell-gap. The first and second substrates are attached to each other by a seal pattern formed along the outer edge of an effective image display area on the substrates. A polarizing plate, a retardation plate and like components are installed on outer surfaces of the first and second substrates. Such a plurality of components are selectively constructed, so as to vary an advancing state of light and a refraction ratio to construct a liquid crystal display device having high brightness and high contrast.

A common electrode and a pixel electrode are formed on the surfaces of the first and second substrates that oppose each other. An electric field to the liquid crystal layer between the common electrode and the pixel electrode. That is, a first voltage is applied to the pixel electrode while second voltage, i.e. ground voltage, is applied to the common electrode such that light transmittance of the unit pixels can be individually controlled. To control the voltage applied to the pixel electrode of the unit pixels, a thin film transistor is formed in each unit pixel and used as a switching device.

Alignment layers are also formed on the opposing surfaces of the first and second substrates over the common electrode and the pixel electrode. The alignment layers are rubbed so that liquid crystal molecules of the liquid crystal layer are aligned into a predetermined direction.

FIG. 1 is a plan view illustrating a related art liquid crystal display panel in which a first substrate having a thin film transistor array and a second substrate having a color filter array are attached to each other. As shown in FIG. 1, the liquid crystal display panel 100 includes an image display unit 113 having a plurality of pixels arranged in a matrix form, a gate pad unit 114 connecting to a plurality of gate lines of the image display unit 113, and a data pad unit 115 connecting to a plurality of data lines. The gate pad unit 114 and the data pad unit 115 are formed at peripheral portions of a first substrate 101. The gate pad unit 114 on the first substrate is not overlapped by the second substrate 102. The gate pad unit 114 supplies scanning signals from a gate driving unit to the gate lines of the image display unit 113. The data pad unit 115 supplies image information from a data driving unit to the data lines of the image display unit 113. The data lines receiving the image information and the gate lines receiving the scanning signals are disposed such that the data lines and the gate lines orthogonally cross each other on the first substrate 101. A thin film transistor (not shown) and a pixel electrode (not shown) are formed in each unit pixel defined by the crossing data lines and gate lines.

A black matrix (not shown) is formed on the second substrate 102 corresponding to the gate lines, data lines and the thin film transistors. A plurality of color filters (not shown) corresponding to each unit pixels is formed on the second substrate 102 within the black matrix. In addition, a common transparent electrode corresponding to the pixel electrode is formed on the second substrate 102.

The first substrate 101 and the second substrate 102 are attached by a sealant 116 formed at the periphery of the image display unit 113. Spacers are used to maintain a constant cell-gap between the first substrate 101 and the second substrate 102. The spacers can be ball spacers, such as glass beads or plastic beads, that are dispersed at random between the first substrate 101 and the second substrate 102. However, as liquid crystal display panels have grown in size in recent years, it has becomes more difficult to maintain a precise and uniform cell-gap due to clumping of the ball spacers. Such clumping results in poor picture quality. Therefore, in the case of a large liquid crystal display panel 100, no ball spacers are used. Instead, column spacers or patterned spacers are used that are fixed to either the first substrate 101 or the second substrate 102.

FIG. 2 is a cross-sectional view illustrating a related art liquid crystal display panel on which column spacers are formed. As shown in FIG. 2, a liquid crystal display panel 200 includes a first substrate 201 having a thin film transistor array and a second substrate 202 having a color filter array that are attached to each other, so as to face into each other. Column spacers 210 are formed on the second substrate 202, thereby maintaining a cell-gap between the first substrate 201 and the second substrate 202. The column spacers 210 are affixed to the second substrate 202 such that they appropriately contact the surface of the first substrate 201 when the first substrate 201 and the second substrate 202 are attached to each other.

In the case where the column spacers 210 are affixed to the second substrate 202 for appropriate contact with the surface of the first substrate 202 as described above, a problem arises. More specifically, if the second substrate 202 is shifted across the column spacers 210 due to a compression by an external force, such as someone touching the display screen, it takes long time for the second substrate 202 to return to the original position because there is a large frictional force in the surface contact between the column spacers 210 and the first substrate 201. Accordingly, touch smears or compression deficiencies are observed in images of the liquid crystal display panel 200 long after the external force is no longer applied, thereby degrading display quality.

SUMMARY OF THE INVENTION

Accordingly, the present invention is directed to a liquid crystal display panel and a method for fabricating the same that substantially obviate one or more of the problems due to limitations and disadvantages of the related art.

An object of the present invention is to provide a liquid crystal display panel that enables images with touch smears or compression deficiency produced by an external force to restore to normal within a short period of time, and a method for fabricating the same.

Another object of the present invention is to provide a method for fabricating liquid crystal display panel that enables images with touch smears or compression deficiency produced by an external force to restore to normal within a short period of time.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display panel includes a first substrate and a second substrate, a column spacer between the first substrate and the second substrate to maintain a cell-gap, contact surfaces between the column spacer and one of the first substrate and the second substrate, at least one of the contact surfaces having a plurality of holes; and a liquid crystal layer between the first substrate and the second substrate.

In another aspect, a liquid crystal display panel includes a plurality of gate lines and data lines defining a plurality of pixel regions, an etch stopper on the gate lines, a passivation layer over the etch stopper, at least one hole in the passivation layer, and a column spacer on the passivation layer directly above the etch stopper, wherein the column spacer has a cross-sectional area smaller than area of the etch stopper.

In another aspect, a liquid crystal display panel includes a plurality of gate lines on a first substrate, a gate insulating layer over the first substrate, etch stopper on the gate insulating layer, a passivation layer over the first substrate, a plurality of holes in a region of the passivation layer exposing parts of the etch stopper, a black matrix on a second substrate, color filters over the second substrate, an overcoating layer over the second substrate, column spacer on the overcoating layer for maintaining a uniform cell-gap, the column spacer contacting the passivation layer in the region of the passivation layer having holes; and a liquid crystal layer between the first substrate and the second substrate.

A liquid crystal display panel includes a first substrate and a second substrate, a column spacer between the first substrate and the second substrate for maintaining a uniform cell-gap, and a liquid crystal layer between the first substrate and the second substrate, contact surfaces between the column spacer and one of the first substrate and the second substrate, wherein one of the contact surfaces has a smaller area.

In another aspect, there is provided method of fabricating a liquid crystal display panel that includes forming a plurality of holes in a surface of a first substrate, forming column spacer on a second substrate, and attaching the first substrate and the second substrate to contact the surface of the first substrate having the holes to the column spacer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in FIGS. 3 to 8.

Figure 1:
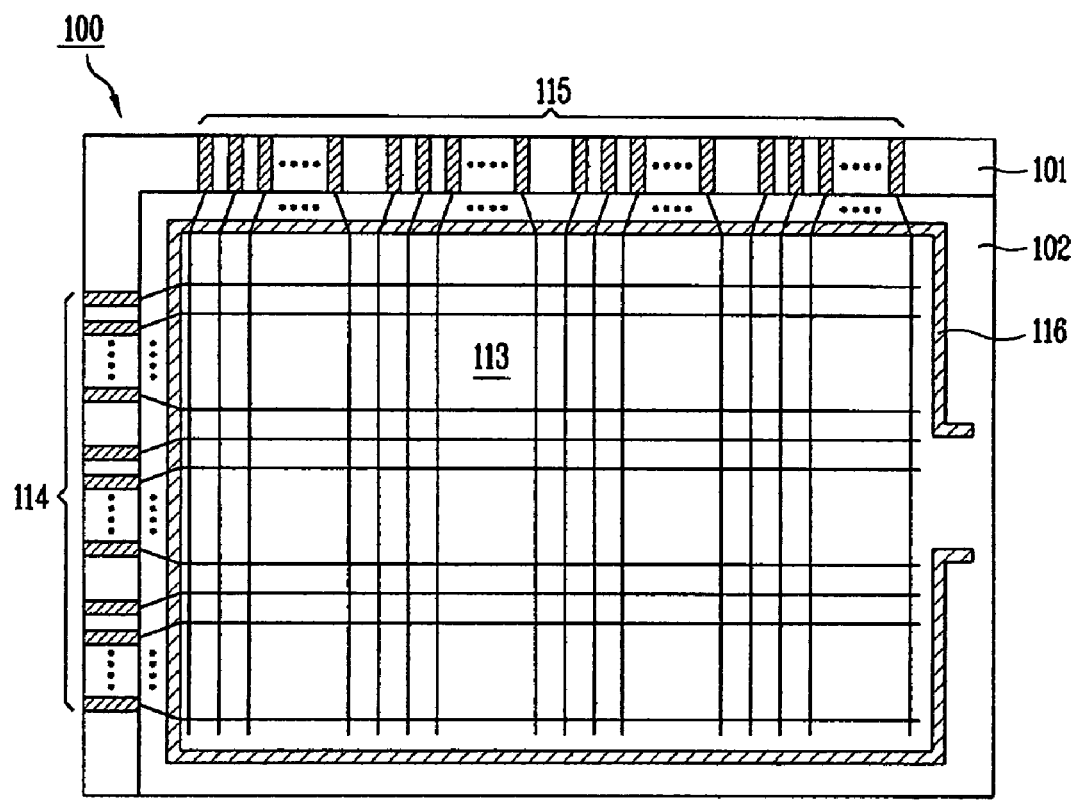
FIG. 1 is a plan view illustrating a related art liquid crystal display panel.
Figure 2:
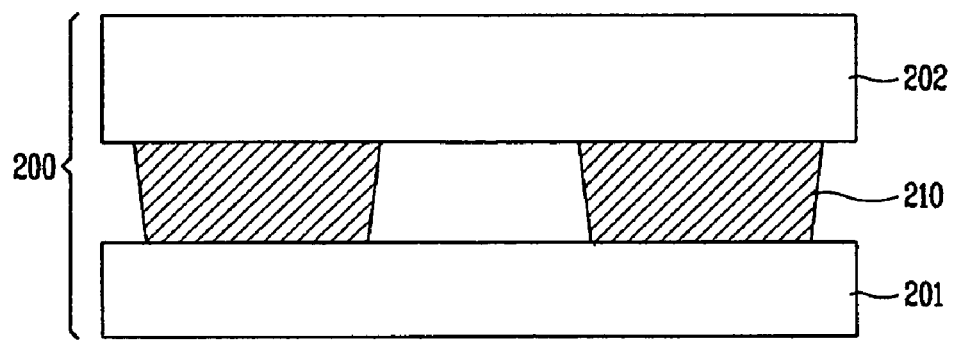
FIG. 2 is a cross-sectional view illustrating a related art liquid crystal display panel on which column spacers are formed.
Figure 3:
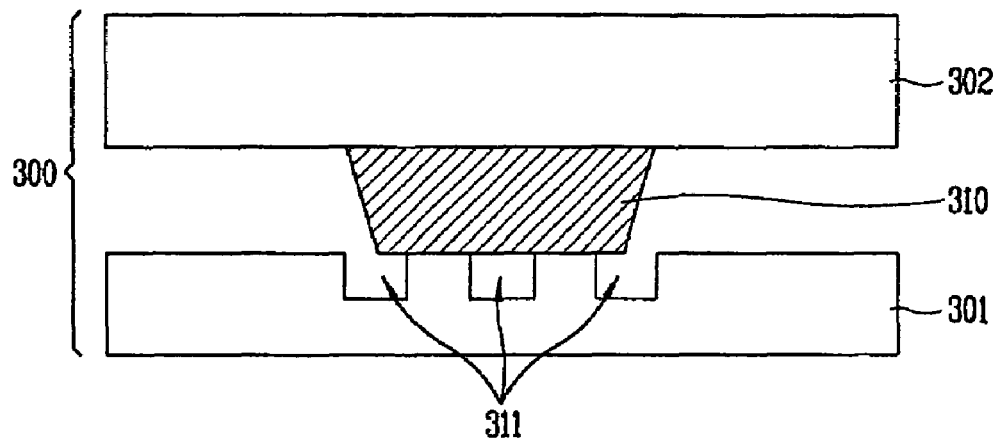
FIG. 3 is a cross-sectional view illustrating a liquid crystal display panel according to a first embodiment of the present invention.

FIG. 3 is a cross-sectional view illustrating a liquid crystal display panel according to a first embodiment of the present invention. Referring to FIG. 3, the liquid crystal display panel 300 according to the first embodiment of the present invention includes a first substrate 301 having a thin film transistor array, a second substrate 302 having a color filter array and attached to the first substrate 301, column spacers 310 formed on the second substrate 302 for constantly maintaining a cell-gap between the first substrate 301 and the second substrate 302, a plurality of holes 311 formed in the surface of the first substrate 301 contacting the column spacers 310, and a liquid crystal layer (not shown) formed in the cell-gap between the first substrate 301 and the second substrate 302. In the liquid crystal display panel 300 according to the first embodiment of the present invention, the column spacers 310 are attached to the second substrate 302, and the plurality of holes 311 are formed in the surface of the first substrate 301 such that at least one of the holes 311 is covered by one of the column spacers 310. Further, the column spacers 310 can only partially cover a hole in the surface of the first substrate 301.

Figure 4:
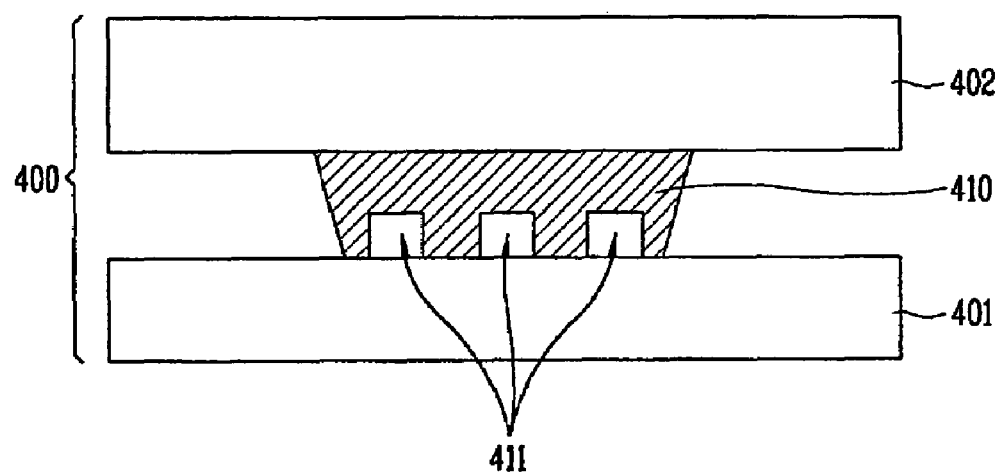
FIG. 4 is a cross-sectional view illustrating a liquid crystal display panel according to a second embodiment of the present invention.

FIG. 4 is a cross-sectional view illustrating a liquid crystal display panel according to a second embodiment of the present invention. Referring to FIG. 4, the liquid crystal display panel 400 according to the second embodiment of the present invention includes a first substrate 401 having a thin film transistor array, a second substrate 402 having a color filter array and attached to the first substrate 401, column spacers 410 formed on the second substrate 402 for maintaining a cell-gap between the first substrate 401 and the second substrate 402, a plurality of holes 411 formed in the surface of the column spacers 410 contacting the first substrate 401, and a liquid crystal layer (not shown) formed in the cell-gap between the first substrate 401 and the second substrate 402. In the liquid crystal display panel 400 according to the second embodiment of the present invention, the column spacers 410 are attached to the second substrate 402, and the plurality of holes 411 are formed in the surface of the column spacers 410

Figure 5:
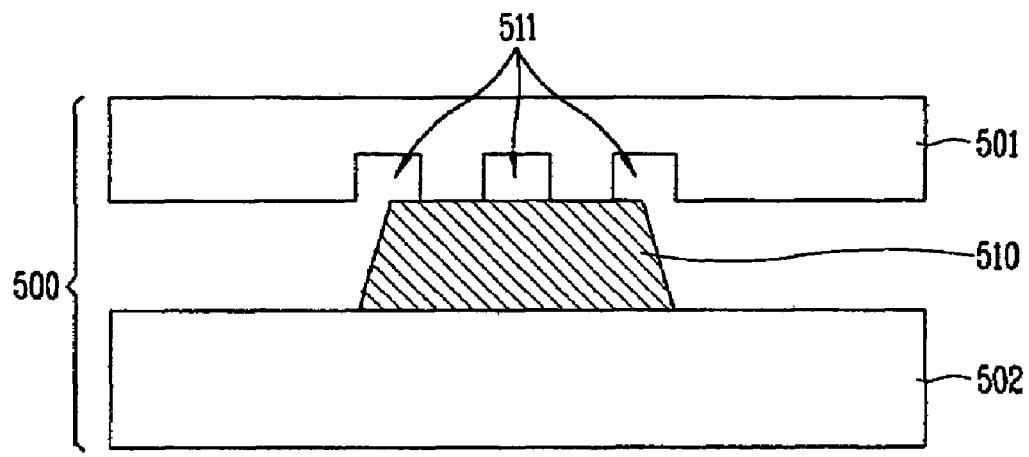
FIG. 5 is a cross-sectional view illustrating a liquid crystal display panel according to a third embodiment of the present invention.

FIG. 5 is a cross-sectional view illustrating a liquid crystal display panel according to a third embodiment of the present invention. Referring to FIG. 5, the liquid crystal display panel 500 according to the third embodiment of the present invention includes a first substrate 501 having a thin film transistor array, a second substrate 502 having a color filter array and attached to the first substrate 501, column spacers 510 formed on the first substrate 501 for constantly maintaining a cell-gap between the first substrate 501 and the second substrate 502, a plurality of holes 511 formed in the surface of the second substrate 502 contacting the column spacers 510, and a liquid crystal layer (not shown) formed in the cell-gap between the first substrate 501 and the second substrate 502. In the liquid crystal display panel 500 according to the third embodiment of the present invention, the column spacers 510 are attached to the first substrate 501, and the plurality of holes 511 are formed in the surface of the second substrate 502 such that at least one of the holes 511 is covered by one of the column spacers 310. Further, the column spacers 510 can only partially cover a hole in the surface of the second substrate 501.

Figure 6:
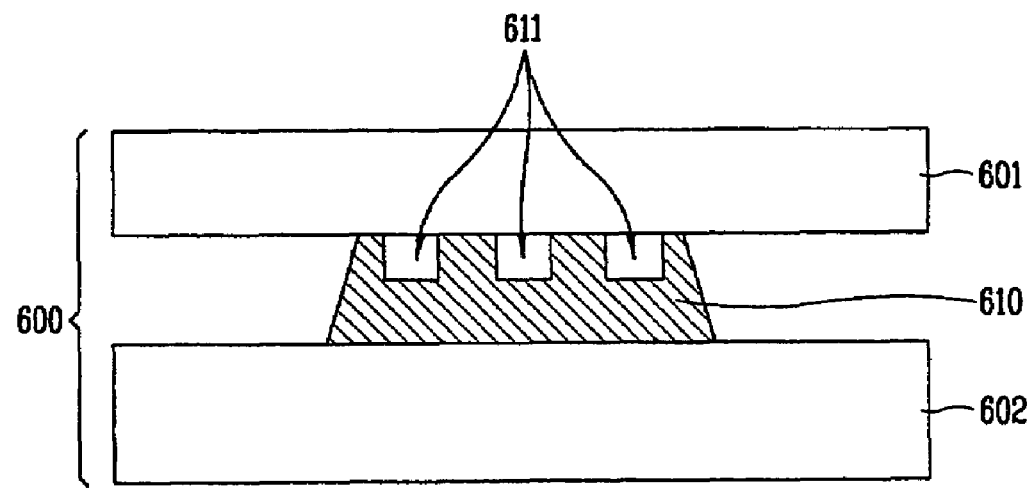
FIG. 6 is a cross-sectional view illustrating a liquid crystal display panel according to a fourth embodiment of the present invention.

FIG. 6 is a cross-sectional view illustrating a liquid crystal display panel according to a fourth embodiment of the present invention. As shown in FIG. 6, the liquid crystal display panel 600 according to the fourth embodiment of the present invention includes a first substrate 601 having a thin film transistor array, a second substrate 602 having a color filter array and attached to the first substrate 601, column spacers 610 formed on the first substrate 601 for maintaining a cell-gap between the first substrate 601 and the second substrate 602, a plurality of holes 611 formed in the surface of the column spacers 610 contacting the second substrate 602, and a liquid crystal layer (not shown) formed in the cell-gap between the first substrate 601 and the second substrate 602. In the liquid crystal display panel 600 according to the fourth embodiment of the present invention, the column spacers 610 are attached to the first substrate 601, and the plurality of holes 611 are formed in the surface of the column spacers 610.

In the liquid crystal display panel according to the first to fourth embodiments of the present invention, the column spacers for maintaining a cell-gap between the first substrate and the second substrate are affixed to one of either the first and second substrates. The plurality of holes is formed in a contact surface of one of either the column spacers and the substrate. The plurality of holes decrease the contact surface area of a contact surface between the column spacers and the substrate. The decrease in contact surface area reduces frictional force. Thus, if the second substrate is shifted across the column spacers by an external force, such as compression, to produce touch smears or compression deficiency, the first substrate or the second substrate easily returns to its original position due to the decreased frictional forces between one of the substrates and the column spacers. Accordingly, images of the liquid crystal display panel where touch smears or compression deficiency are observed, restore to normal images within a short period of time, thereby enhancing display quality.

Figure 7:
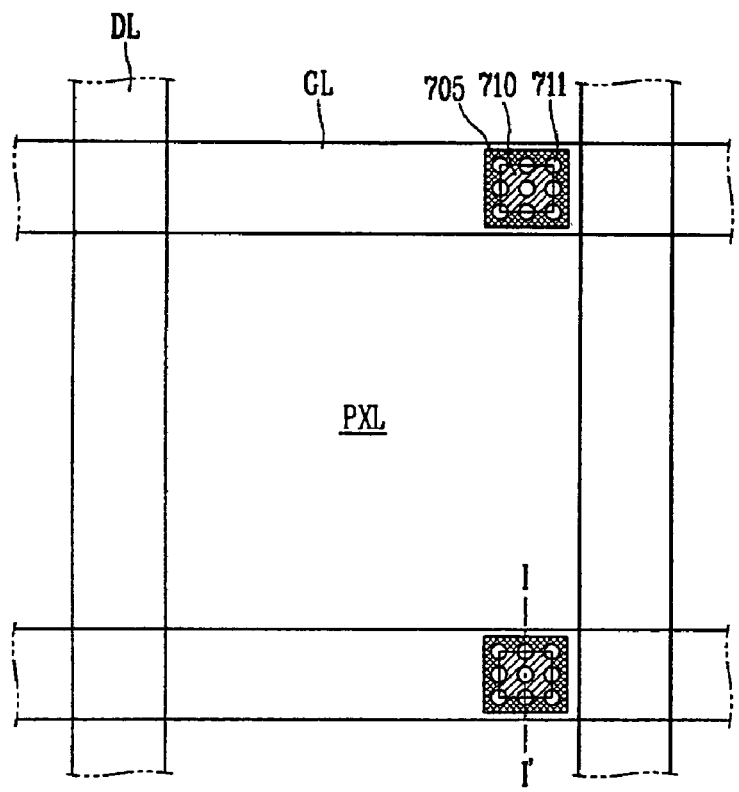
FIG. 7 is a plan view illustrating a liquid crystal display panel according to an embodiment of the present invention.

FIG. 7 is a plan view illustrating a liquid crystal display panel according to an embodiment of the present invention. As shown in FIG. 7, the liquid crystal display panel according to an embodiment of the present invention includes a plurality of gate lines GL arranged at regular intervals horizontally, a plurality of data lines DL arranged at regular intervals perpendicularly crossing the gate lines GL, pixels PXL defined by the gate lines GL and the data lines DL crossing each other, etch stoppers 705 formed on the gate lines GL, a plurality of holes 711 formed in the etch stoppers 705, and column spacers 710 contact the etch stoppers 705 with a contact area between one of the column spacers 710 and one of the etch stoppers 705 that is less than the surface area of one of the etch stoppers 705. Further, the column spacers 710 have a cross-sectional area smaller than an area of the etch stopper, as shown in FIG. 7.

Each of the pixels PXL have a switching device, such as a thin film transistor, for selectively supplying image signals applied via the data lines DL in response to scanning signals applied via the gate lines GL to the pixels PXL. Each of the pixels PXL also has a pixel electrode for driving the liquid crystal layer with the image signals applied through the thin film transistor. Each of the thin film transistors is provided with a gate electrode extending from a predetermined position of a gate line, a source electrode extending from a predetermined position of a data line and a drain electrode opposite to the source electrode. The drain electrode is electrically contacted to the pixel electrode via a drain contact hole. The pixel electrode is formed of a conductive material having a high light transmittance, for example, ITO (indium tin oxide) or IZO (indium zinc oxide). The thin film transistor is provided with a semiconductor layer such that a conduction channel is formed between the source electrode and the drain electrode when a scanning signals is supplied to the gate electrode via the gate line GL.

The etch stoppers 705 are formed on the gate lines GL. A passivation layer is formed over the gate lines. A plurality of holes 711 are formed in the passivation layer. The column spacers 710 contact the passivation layer with a contact area less than the surface area of one of the etch stoppers 705. The plurality of holes 711 can be formed in various shapes, such as a circular cylinder, a square cylinder and a triangular prism.

Figure 8:
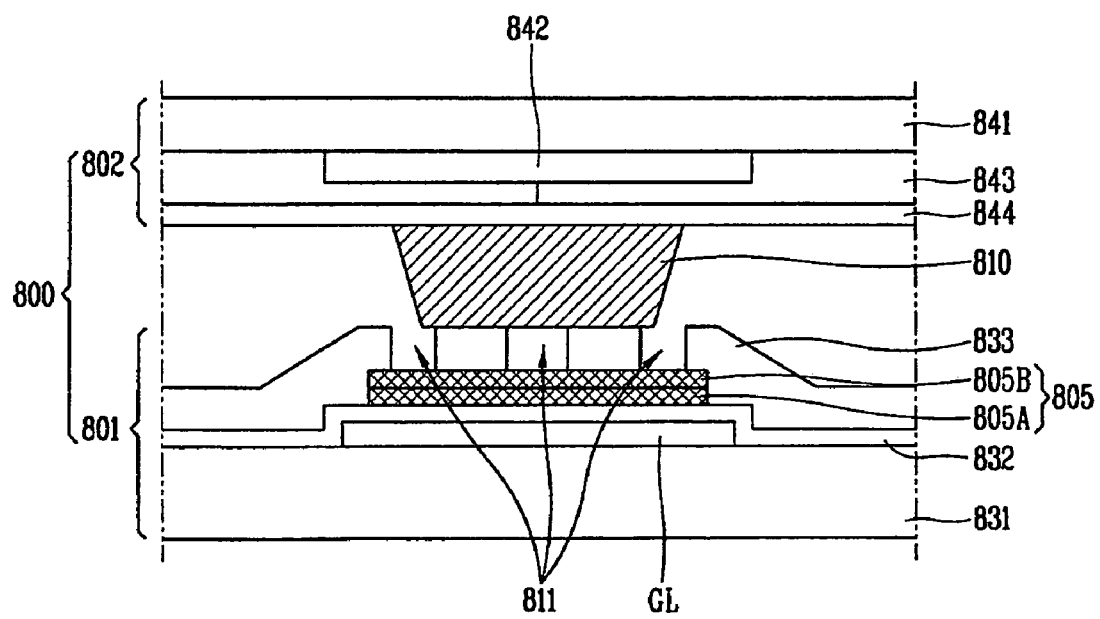
FIG. 8 is a cross-sectional view taken along line I-I' of FIG. 7.

FIG. 8 is a cross-sectional view taken along line I-I' of FIG. 7. Referring to FIG. 8, a liquid crystal display panel 800 according to the present invention includes a first substrate 801 having a thin film transistor array, a second substrate 802 having a color filter array and attached to the first substrate 801, column spacers 810 formed on the second substrate 802 for maintaining a cell-gap between the first substrate 801 and the second substrate 802, and a liquid crystal layer (not shown) formed in the cell-gap between the first substrate 801 and the second substrate 802. The first substrate 801 includes gate lines GL formed on a substrate 831, a gate insulating layer 832, a gate insulating layer 832 formed on the entire surface of the substrate 831 where the gate lines GL are formed, etch stoppers 805 on the gate insulating layer 832 of the regions where the gate lines GL are formed, a passivation layer 833 formed on the entire surface of the substrate 831 where the etch stoppers 805 are formed, and a plurality of holes formed by etching parts of the passivation layer 805 over the etch stoppers 805.

The etch stoppers 805 are formed with a smaller width than the width of the gate lines GL. The etch stoppers 805 include a first layer 805A of the same material as a semiconductor layer functioning as a conduction channel of the aforementioned thin film transistors and a second layer 805B of the same material as the source/drain electrodes of the aforementioned thin film transistor. The first and second layers 805A and 805B of the etch stopper 805 protects the gate lines GL by preventing the etching of the gate insulating layer 832 during an etching process of the passivation layer 833 when forming the plurality of holes 811.

The second substrate 802 includes a black matrix 842 formed on a substrate 841, red, green and blue color filters 843 defined by the black matrix 842 and arranged in a matrix so as to correspond to pixel regions, and an overcoating layer 844 for planarizing the surface of the substrate 841 where the red, green and blue color filters 843 are formed. The column spacers 810 are formed on the overcoating layer 844. In the case where the lamination structure of the black matrix 842 and the red, green and blue color filters 843 is planarized, the overcoating layer 844 is not formed so the column spacers 810 are formed on the black matrix 842 or red, green and blue color filters 843.

A method for fabricating the liquid crystal display panel according to embodiments of the present invention includes the steps of forming a first substrate 801; forming a second substrate 802, forming a plurality of holes 811 on the surface of the first substrate 801, forming column spacers 810 on the second substrate 802, and attaching the first substrate 801 and the second substrate 802 such that the regions where the holes 811 of the first substrate 801 are formed and the regions where the column spacers 810 of the second substrate 802 are formed in contact with each other. This process be described in more detail below.

First, the step of forming the plurality of holes 811 on the first substrate 801 includes the steps of patterning gate lines GL on a substrate 831, forming a gate insulating layer 832 on the entire surface of the top surface of the substrate 831 where the gate lines GL are patterned, forming etch stoppers 805 on the gate insulating layer 832 of the regions where the gate lines GL are formed by sequentially forming a first layer 805A of the same material as a semiconductor layer functioning as a conduction channel of thin film transistors and a second layer 805B of the same material as source/drain electrodes of the thin film transistors and then patterning them; forming a passivation layer 833 over the etch stoppers 805, and forming a plurality of holes 811 by etching parts of the passivation layer 833 until the etch stoppers 805 are exposed.

In the step of patterning the gate lines GL on the substrate 831, the thin film transistors and the gate electrodes are simultaneously patterned. In the step of forming the etch stoppers 805 on top of the gate insulating layer 832 of the regions where the gate lines GL are formed, the semiconductor layer, source/drain electrodes and data lines of the thin film transistors are simultaneously formed. In the step of forming the plurality of holes 811 by etching parts of the passivation layer 833, drain contact holes for exposing the drain electrodes of the thin film transistors are simultaneously formed.

The step of forming the column spacers 810 on the second substrate 802 includes the steps of forming a black matrix 842 on a substrate 841, forming red, green and blue color filters 843 on the substrate 841 where the black matrix 842 is formed; and forming an overcoating layer 844 on the entire surface of the top part of the substrate 841 where the black matrix 842 and the red, green and blue color filters 843 are formed. A liquid crystal layer is formed in the cell-gap between the first substrate 801 and the second substrate 802. The sequence of forming the liquid crystal layer may vary depending on a method of forming the liquid crystal layer.

The method of forming the liquid crystal layer may be divided into a vacuum injection method and a dispensing method. The vacuum injection method is that a liquid crystal injection opening of a liquid crystal display panel is dipped in a container filed with the liquid crystal in a chamber with a predetermined degree of vacuum set thereto, and then the liquid crystal is injected into the liquid crystal display panel by a pressure difference between the inner side and the outer side of the liquid crystal display panel by varying a degree of vacuum. After the liquid crystal is filled in the liquid crystal display panel, the liquid crystal injection opening is encapsulated to form a liquid crystal layer of the liquid crystal display panel. Therefore, in the above vacuum injecting method, the first substrate 801 and the second substrate 802 are attached to each other, and then a liquid crystal layer is formed in the cell-gap between the first substrate 801 and the second substrate 802.

The vacuum injection method as described above has the following problems. First, it takes a long time to fill the liquid crystal in the liquid crystal display panel. In general, an attached liquid crystal display panel with an area of several hundreds square-centimeters ($cm^2$) has a cell-gap of a few micrometers ($\mu m$). Thus, even with the vacuum injection method which uses a pressure difference, an injecting amount of the liquid crystal per unit time is quite small.

Second, as the liquid crystal display panel becomes larger in size, the time required to fill the liquid crystal is increase. Further, additional deficiencies in filling the liquid crystal may occur. Therefore, the vacuum injection method cannot be used for a large-sized liquid crystal display panel.

Third, too much liquid crystal is consumed in the vacuum injection method. In general, the actual amount of the liquid crystal used is very small compared to the amount of the liquid crystal in the container, and when liquid crystal is exposed to the air or a specific gas, it reacts with the gas and degrades. Thus, even if the liquid crystal filled in the container is used to fill a plurality of liquid crystal display panels, a large amount of the liquid crystal will still remain after the filling process and such remaining liquid crystal is discarded. As a result, unit price of the liquid crystal display is increased.

In order to overcome such problems of the vacuum injection method, recently, a dispensing method has been adopted. The dispensing method is that the liquid crystal is dropped and dispensed on an image display part of the first substrate 801 or the second substrate 802, so that the liquid crystal is uniformly distributed over the entire image display part by a pressure generated when the first substrate 801 and the second substrate 802 are attached to each other, thereby forming a uniform liquid crystal layer. Unlike the vacuum injection method, the first substrate 801 and the second substrate 802 are attached to each other after the liquid crystal layer is formed in the dropping method. In the dispensing method, the liquid crystal may be dropped within a short time compared to the vacuum injection method. Thus, for a large-sized liquid crystal display panel, a liquid crystal layer can be quickly formed between the substrates. In addition, since only a required amount of the liquid crystal is dropped on the substrate, the unit price of the liquid crystal display panel can be kept low by preventing a unit price increase of the liquid crystal display panel by discarding expensive liquid crystal.

As described above, in the liquid crystal display panel and the method for fabricating the same according to the present invention, column spacers for maintaining a cell-gap between the first substrate and the second substrate are affixed to one of the substrates. Since a plurality of holes are formed in the contact surface between the column spacers and the substrates, the contact surface area between the column spacers and the substrates is reduced, thereby minimizing frictional force.

Accordingly, if the second substrate is shifted in one direction by an external force to thus produce touch smears or compression deficiency, the time for the first substrate or the second substrate to return to the original position is reduced. Due to this, images of the liquid crystal display panel where touch smears or compression deficiency are observed are restored to normal images within a short time, thereby enhancing the display quality.

It will be apparent to those skilled in the art that various modifications and variations can be made in the liquid crystal display panel and a method for fabricating the same of the present invention without departing from the spirit or scope of the invention. Thus, it is intended that the present invention cover the modifications and variations of this invention provided they come within the scope of the appended claims and their equivalents.

What is claimed is:

1. A liquid crystal display panel, comprising:
a plurality of gate lines and data lines defining a plurality of pixel regions;
an etch stopper on the gate lines;
a passivation layer over the etch stopper;
at least one hole in the passivation layer; and
a column spacer on the passivation layer directly above the etch stopper,
wherein the column spacer has a cross-sectional area smaller than an area of the etch stopper.

2. The liquid crystal display panel of claim 1, wherein the column spacer covers the hole.

3. A liquid crystal display panel, comprising:
a plurality of gate lines on a first substrate;
a gate insulating layer over the first substrate;
etch stopper on the gate insulating layer;
a passivation layer over the first substrate;
a plurality of holes in a region of the passivation layer exposing parts of the etch stopper;
a black matrix on a second substrate;
color filters over the second substrate;
an overcoating layer over the second substrate;
a column spacer on the overcoating layer for maintaining a uniform cell-gap; and
a liquid crystal layer between the first substrate and the second substrate,
wherein the column spacer is contacted with the region of the passivation layer in which the holes are formed so that the area of the contact surfaces between the column spacer and the passivation layer is smaller than that of the surface of the spacer,
wherein the column spacer has a cross-sectional area smaller than an area of the etch stopper.

4. The liquid crystal display panel of claim 3, wherein the etch stopper includes:
a first layer of the same material as a semiconductor layer functioning as a conduction channel of a thin film transistor; and
a second layer made of the same material as source/drain electrodes of the thin film transistor.

5. The liquid crystal display panel of claim 3, wherein the etch stopper has a width narrower than that of the gate line.

6. A method of fabricating a liquid crystal display panel, the method comprising:
forming gate line on a first substrate;
forming a gate insulating layer over the first substrate;
forming a etch stopper on the gate insulating layer;
forming a passivation layer over the gate insulating layer; and
etching the passivation layer to form a plurality of holes to expose the etch stopper;
forming column spacer on a second substrate; and
attaching the first substrate and the second substrate to contact the surface of the first substrate having the holes to the column spacer, thereby the area of the contact surfaces between the column spacer and the first substrate is smaller than that of the surface of the spacer,
wherein the column spacer has a cross-sectional area smaller than an area of the etch stopper.

7. The method of claim 6, wherein the forming the etch stopper includes:
forming a first layer formed of the same material as a semiconductor layer functioning as a conduction channel of thin film transistors;
forming a second layer of a same material as source/drain electrodes of the thin film transistors on the gate insulating layer; and
patterning the first layer and the second layer to remain on the gate insulating layer in the regions where the gate lines are formed.

8. The method of claim 6, wherein the forming the column spacers over the second substrate includes:
forming a black matrix and a color filter over the second substrate;
forming an overcoating layer on the over the second substrate; and
forming the column spacer on the overcoating layer.

9. The method of claim 6, further comprising forming a liquid crystal layer between the first substrate and the second substrate.

10. The method of claim 9, wherein the forming a liquid crystal layer between the first substrate and the second substrate includes by injecting liquid crystal between the attached first and second substrates by a vacuum injection method.

11. The method of claim 9, wherein the forming a liquid crystal layer between the first substrate and the second substrate includes:
dropping liquid crystal on at least one of first and second substrates; and
dispersing the dropped liquid crystal by a pressure generated when the first substrate and the second substrate are attached to each other.

* * * * *